US012620390B2

(12) United States Patent
Bruguier et al.

(10) Patent No.: US 12,620,390 B2
(45) Date of Patent: May 5, 2026

(54) FLICKERING REDUCTION WITH PARTIAL HYPOTHESIS RE-RANKING FOR STREAMING ASR

(71) Applicant: Google LLC, Mountain View, CA (US)

(72) Inventors: Antoine Jean Bruguier, Milpitas, CA (US); David Qiu, Fremont, CA (US); Yanzhang He, Mountain View, CA (US); Trevor Strohman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 333 days.

(21) Appl. No.: 18/352,211

(22) Filed: Jul. 13, 2023

(65) Prior Publication Data

US 2024/0029718 A1 Jan. 25, 2024

Related U.S. Application Data

(60) Provisional application No. 63/369,216, filed on Jul. 22, 2022.

(51) Int. Cl.
*G10L 15/26* (2006.01)
*G10L 15/10* (2006.01)
*G10L 15/08* (2006.01)
*G10L 15/22* (2006.01)

(52) U.S. Cl.
CPC .............. *G10L 15/10* (2013.01); *G10L 15/26* (2013.01); *G10L 15/08* (2013.01); *G10L 15/22* (2013.01)

(58) Field of Classification Search
CPC ................................. G10L 15/22; G10L 15/08
See application file for complete search history.

(56) References Cited

U.S. PATENT DOCUMENTS

| | | | | |
|---|---|---|---|---|
| 2013/0110492 A1* | 5/2013 | McGraw | ................. | G03F 7/707 |
| | | | | 704/E15.005 |
| 2022/0270597 A1* | 8/2022 | Qiu | .......................... | G06N 3/09 |

OTHER PUBLICATIONS

Shangguan, "Analyzing the Quality and Stability of a Streaming End-to-End On-Device Speech Recognizer," arXiv, 2020. (Year: 2020).*

(Continued)

*Primary Examiner* — Feng-Tzer Tzeng
(74) *Attorney, Agent, or Firm* — Honigman LLP; Brett A. Krueger; Grant Griffith

(57) ABSTRACT

A method includes processing, using a speech recognizer, a first portion of audio data to generate a first lattice, and generating a first partial transcription for an utterance based on the first lattice. The method includes processing, using the recognizer, a second portion of the data to generate, based on the first lattice, a second lattice representing a plurality of partial speech recognition hypotheses for the utterance and a plurality of corresponding speech recognition scores. For each particular partial speech recognition hypothesis, the method includes generating a corresponding re-ranked score based on the corresponding speech recognition score and whether the particular partial speech recognition hypothesis shares a prefix with the first partial transcription. The method includes generating a second partial transcription for the utterance by selecting the partial speech recognition hypothesis of the second plurality of partial speech recognition hypotheses having the highest corresponding re-ranked score.

16 Claims, 5 Drawing Sheets

(56)                    References Cited

OTHER PUBLICATIONS

Shangguan, "Analyzing the Quality and Stability of a Streaming End-to-End On-Device Speech Recognizer," arXiv, 2020—see attached reference in the previous Office action. (Year: 2020).*
WIPO. International Search Report and Written Opinion relating to application PCT/US2023/027691, dated Oct. 13, 2023.
Mcgraw Ian et al:"Estimating Word-Stability During Incremental Speech Recognition", Jan. 1, 2011 (Jan. 1, 2011), XPO55858344, Retrieved from the Internet: URL:https://research.google/pubs/pub4O463. pdf [retrieved on Nov. 5, 2021]abstract US 2013/110492 A1 (Mcgraw Ian C [US] Etal) May 2, 2013 (May 2, 2013) figures 1,2A.
Yuan Shangguan et al:"Analyzing the Quality and Stability of a Streaming End-to-End On-Device Speech Recognizer", arxiv.org, Cornell University Library, 201 Olin Library Cornell University Ithaca, NY 14853, Aug. 15, 2020 (Aug. 15, 2020), XP081741770, the whole document.

* cited by examiner

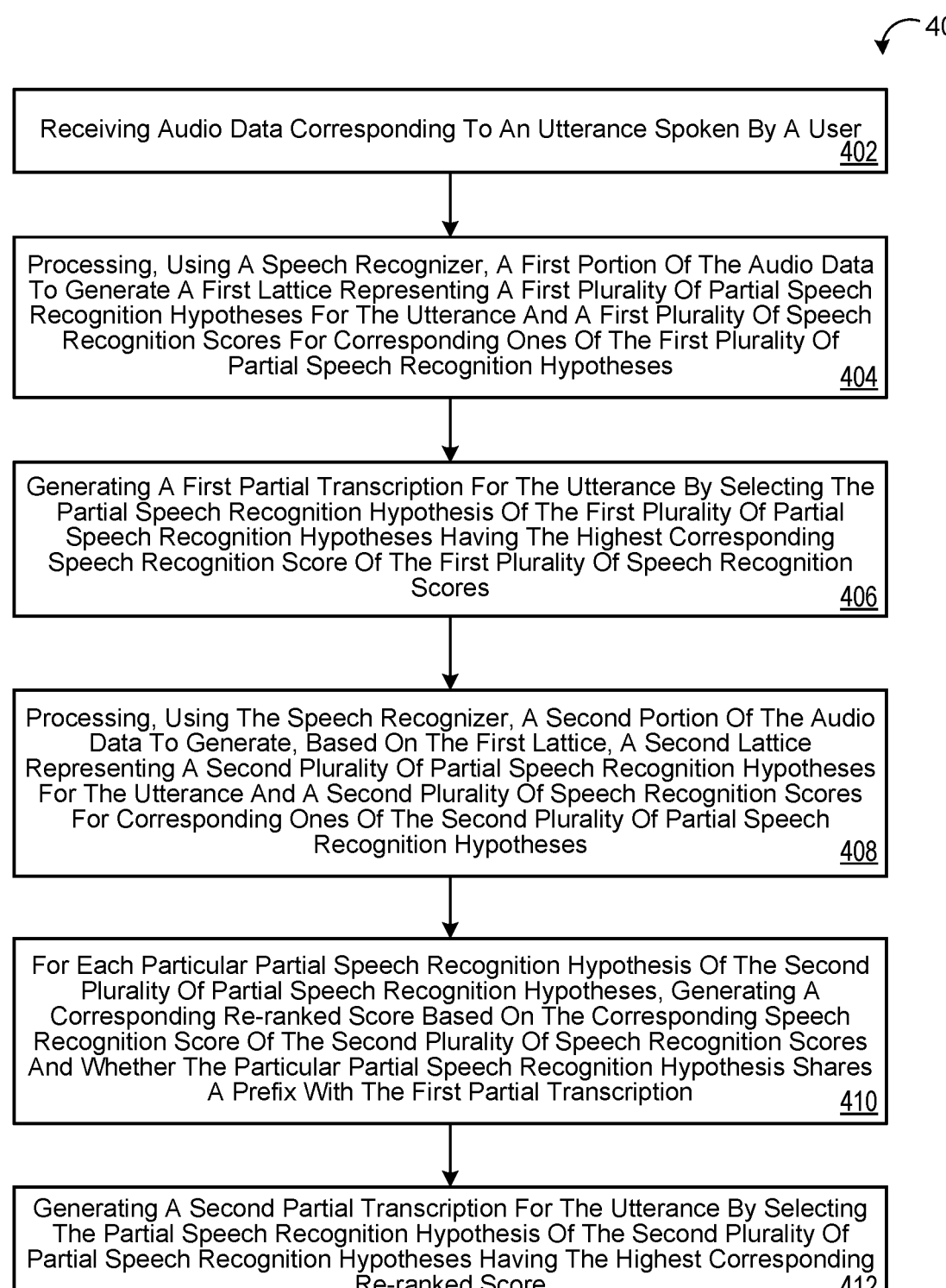

400

Receiving Audio Data Corresponding To An Utterance Spoken By A User
402

Processing, Using A Speech Recognizer, A First Portion Of The Audio Data To Generate A First Lattice Representing A First Plurality Of Partial Speech Recognition Hypotheses For The Utterance And A First Plurality Of Speech Recognition Scores For Corresponding Ones Of The First Plurality Of Partial Speech Recognition Hypotheses
404

Generating A First Partial Transcription For The Utterance By Selecting The Partial Speech Recognition Hypothesis Of The First Plurality Of Partial Speech Recognition Hypotheses Having The Highest Corresponding Speech Recognition Score Of The First Plurality Of Speech Recognition Scores
406

Processing, Using The Speech Recognizer, A Second Portion Of The Audio Data To Generate, Based On The First Lattice, A Second Lattice Representing A Second Plurality Of Partial Speech Recognition Hypotheses For The Utterance And A Second Plurality Of Speech Recognition Scores For Corresponding Ones Of The Second Plurality Of Partial Speech Recognition Hypotheses
408

For Each Particular Partial Speech Recognition Hypothesis Of The Second Plurality Of Partial Speech Recognition Hypotheses, Generating A Corresponding Re-ranked Score Based On The Corresponding Speech Recognition Score Of The Second Plurality Of Speech Recognition Scores And Whether The Particular Partial Speech Recognition Hypothesis Shares A Prefix With The First Partial Transcription
410

Generating A Second Partial Transcription For The Utterance By Selecting The Partial Speech Recognition Hypothesis Of The Second Plurality Of Partial Speech Recognition Hypotheses Having The Highest Corresponding Re-ranked Score
412

FIG. 4

FLICKERING REDUCTION WITH PARTIAL HYPOTHESIS RE-RANKING FOR STREAMING ASR

CROSS REFERENCE TO RELATED APPLICATIONS

This U.S. Patent Applications claims priority under 35 U.S.C. § 119(e) to U.S. Provisional Application 63/369,216, filed on Jul. 22, 2022. The disclosure of this prior application is considered part of the disclosure of this application and is hereby incorporated herein by reference in its entirety.

TECHNICAL FIELD

This disclosure relates to flickering reduction with partial hypothesis re-ranking for streaming automatic speech recognition (ASR).

BACKGROUND

Modern automatic speech recognition (ASR) systems focus on providing not only high quality (e.g., a low word error rate), but also low latency (e.g., a short delay between the user speaking and a transcription appearing) speech recognition for spoken utterances. For example, when using a device that implements an ASR system, there is often an expectation that the ASR system decodes utterances in a streaming fashion that corresponds to real-time or even faster than real-time.

SUMMARY

One aspect of the disclosure provides a computer-implemented method for flickering reduction with partial hypothesis re-ranking for streaming automatic speech recognition (ASR). The computer-implemented method, when executed on data processing hardware, causes the data processing hardware to perform operations including: receiving audio data corresponding to an utterance spoken by a user; processing, using a speech recognizer, a first portion of the audio data to generate a first lattice representing a first plurality of partial speech recognition hypotheses for the utterance and a first plurality of speech recognition scores for corresponding ones of the first plurality of partial speech recognition hypotheses; and generating a first partial transcription for the utterance by selecting the partial speech recognition hypothesis of the first plurality of partial speech recognition hypotheses having the highest corresponding speech recognition score of the first plurality of speech recognition scores. The operations also include: processing, using the speech recognizer, a second portion of the audio data to generate, based on the first lattice, a second lattice representing a second plurality of partial speech recognition hypotheses for the utterance and a second plurality of speech recognition scores for corresponding ones of the second plurality of partial speech recognition hypotheses, for each particular partial speech recognition hypothesis of the second plurality of partial speech recognition hypotheses; generating a corresponding re-ranked score based on the corresponding speech recognition score of the second plurality of speech recognition scores and whether the particular partial speech recognition hypothesis shares a prefix with the first partial transcription; and generating a second partial transcription for the utterance by selecting the partial speech recognition hypothesis of the second plurality of partial speech recognition hypotheses having the highest corresponding re-ranked score.

Implementations of the disclosure may include one or more of the following optional features. In some implementations, generating the corresponding re-ranked score for each particular partial speech recognition hypothesis of the second plurality of partial speech recognition hypotheses includes determining that the particular partial speech recognition hypothesis does not share the prefix with the first partial transcription and, in response to determining that the particular partial speech recognition hypothesis does not share the prefix with the first partial transcription, adjusting the corresponding speech recognition score of the second plurality of speech recognition scores by a pre-determined amount. In some examples, the operations include selecting the pre-determined amount to adjust an amount of flicker reduction. In some implementations, generating the corresponding re-ranked score for each particular partial speech recognition hypothesis of the second plurality of partial speech recognition hypotheses includes determining a distance between the particular partial speech recognition hypothesis and the first partial transcription, and adjusting the corresponding speech recognition score of the second plurality of speech recognition scores based on the distance.

In some examples, the operations also include: processing, using the speech recognizer, a final portion of the audio data to generate, based on a preceding lattice, a final lattice representing a plurality of full speech recognition hypotheses for the utterance and a final plurality of speech recognition scores for corresponding ones of the plurality of full speech recognition hypotheses; and generating a final transcription for the utterance by selecting the full speech recognition hypothesis of the plurality of full speech recognition hypotheses having the highest corresponding speech recognition score of the final plurality of speech recognition scores. In some implementations, generating the corresponding re-ranked scores does not change values of the second plurality of speech recognition scores of the second lattice.

In some implementations, the operations include: processing, using the speech recognizer, a third portion of the audio data to generate, based on the second lattice, a third lattice representing a third plurality of partial speech recognition hypotheses for the utterance and a third plurality of speech recognition scores for corresponding ones of the third plurality of partial speech recognition hypotheses; for each particular partial speech recognition hypothesis of the third plurality of partial speech recognition hypotheses, generating a re-ranked score based on the corresponding speech recognition score of the third plurality of speech recognition scores and whether the particular partial speech recognition hypothesis includes the second partial transcription; and generating a third partial transcription for the utterance by selecting the speech recognition hypothesis of the third plurality of partial speech recognition hypotheses having the highest corresponding re-ranked score.

In some examples, the first lattice represents a first streaming partial speech recognition result output from the speech recognizer during a first instance of a beam search, and the second lattice represents a second streaming partial speech recognition result output from the speech recognizer during a second instance of the beam search. In some implementations, the operations include displaying the first partial transcription on a display, and displaying the second partial transcription on the display. In some examples, the speech recognizer includes an end-to-end speech recognition model. In some implementations, the utterance spoken by the user is captured by a user device associated with the user, and the data processing hardware resides on the user device.

Another aspect of the disclosure provides a system including data processing hardware, and memory hardware in communication with the data processing hardware and storing instructions that, when executed on the data processing hardware, causes the system to perform operations. The operations including receiving audio data corresponding to an utterance spoken by a user; processing, using a speech recognizer, a first portion of the audio data to generate a first lattice representing a first plurality of partial speech recognition hypotheses for the utterance and a first plurality of speech recognition scores for corresponding ones of the first plurality of partial speech recognition hypotheses; and generating a first partial transcription for the utterance by selecting the partial speech recognition hypothesis of the first plurality of partial speech recognition hypotheses having the highest corresponding speech recognition score of the first plurality of speech recognition scores. The operations also include: processing, using the speech recognizer, a second portion of the audio data to generate, based on the first lattice, a second lattice representing a second plurality of partial speech recognition hypotheses for the utterance and a second plurality of speech recognition scores for corresponding ones of the second plurality of partial speech recognition hypotheses, for each particular partial speech recognition hypothesis of the second plurality of partial speech recognition hypotheses; generating a corresponding re-ranked score based on the corresponding speech recognition score of the second plurality of speech recognition scores and whether the particular partial speech recognition hypothesis shares a prefix with the first partial transcription; and generating a second partial transcription for the utterance by selecting the partial speech recognition hypothesis of the second plurality of partial speech recognition hypotheses having the highest corresponding re-ranked score.

Implementations of the disclosure may include one or more of the following optional features. In some implementations, generating the corresponding re-ranked score for each particular partial speech recognition hypothesis of the second plurality of partial speech recognition hypotheses includes determining that the particular partial speech recognition hypothesis does not share the prefix with the first partial transcription and, in response to determining that the particular partial speech recognition hypothesis does not share the prefix with the first partial transcription, adjusting the corresponding speech recognition score of the second plurality of speech recognition scores by a pre-determined amount. In some examples, the operations include selecting the pre-determined amount to adjust an amount of flicker reduction. In some implementations, generating the corresponding re-ranked score for each particular partial speech recognition hypothesis of the second plurality of partial speech recognition hypotheses includes determining a distance between the particular partial speech recognition hypothesis and the first partial transcription, and adjusting the corresponding speech recognition score of the second plurality of speech recognition scores based on the distance.

In some examples, the operations also include: processing, using the speech recognizer, a final portion of the audio data to generate, based on a preceding lattice, a final lattice representing a plurality of full speech recognition hypotheses for the utterance and a final plurality of speech recognition scores for corresponding ones of the plurality of full speech recognition hypotheses; and generating a final transcription for the utterance by selecting the full speech recognition hypothesis of the plurality of full speech recognition hypotheses having the highest corresponding speech recognition score of the final plurality of speech recognition scores. In some implementations, generating the corresponding re-ranked scores does not change values of the second plurality of speech recognition scores of the second lattice.

In some implementations, the operations include: processing, using the speech recognizer, a third portion of the audio data to generate, based on the second lattice, a third lattice representing a third plurality of partial speech recognition hypotheses for the utterance and a third plurality of speech recognition scores for corresponding ones of the third plurality of partial speech recognition hypotheses; for each particular partial speech recognition hypothesis of the third plurality of partial speech recognition hypotheses, generating a re-ranked score based on the corresponding speech recognition score of the third plurality of speech recognition scores and whether the particular partial speech recognition hypothesis includes the second partial transcription; and generating a third partial transcription for the utterance by selecting the speech recognition hypothesis of the third plurality of partial speech recognition hypotheses having the highest corresponding re-ranked score.

In some examples, the first lattice represents a first streaming partial speech recognition result output from the speech recognizer during a first instance of a beam search, and the second lattice represents a second streaming partial speech recognition result output from the speech recognizer during a second instance of the beam search. In some implementations, the operations include displaying the first partial transcription on a display, and displaying the second partial transcription on the display. In some examples, the speech recognizer includes an end-to-end speech recognition model. In some implementations, the utterance spoken by the user is captured by a user device associated with the user, and the data processing hardware resides on the user device.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a flowchart of another example arrangement of operations for a computer-implemented method of flickering reduction with partial hypothesis re-ranking for streaming automatic speech recognition (ASR).

Like reference symbols in the various drawings indicate like elements.

DETAILED DESCRIPTION

Figure 1:
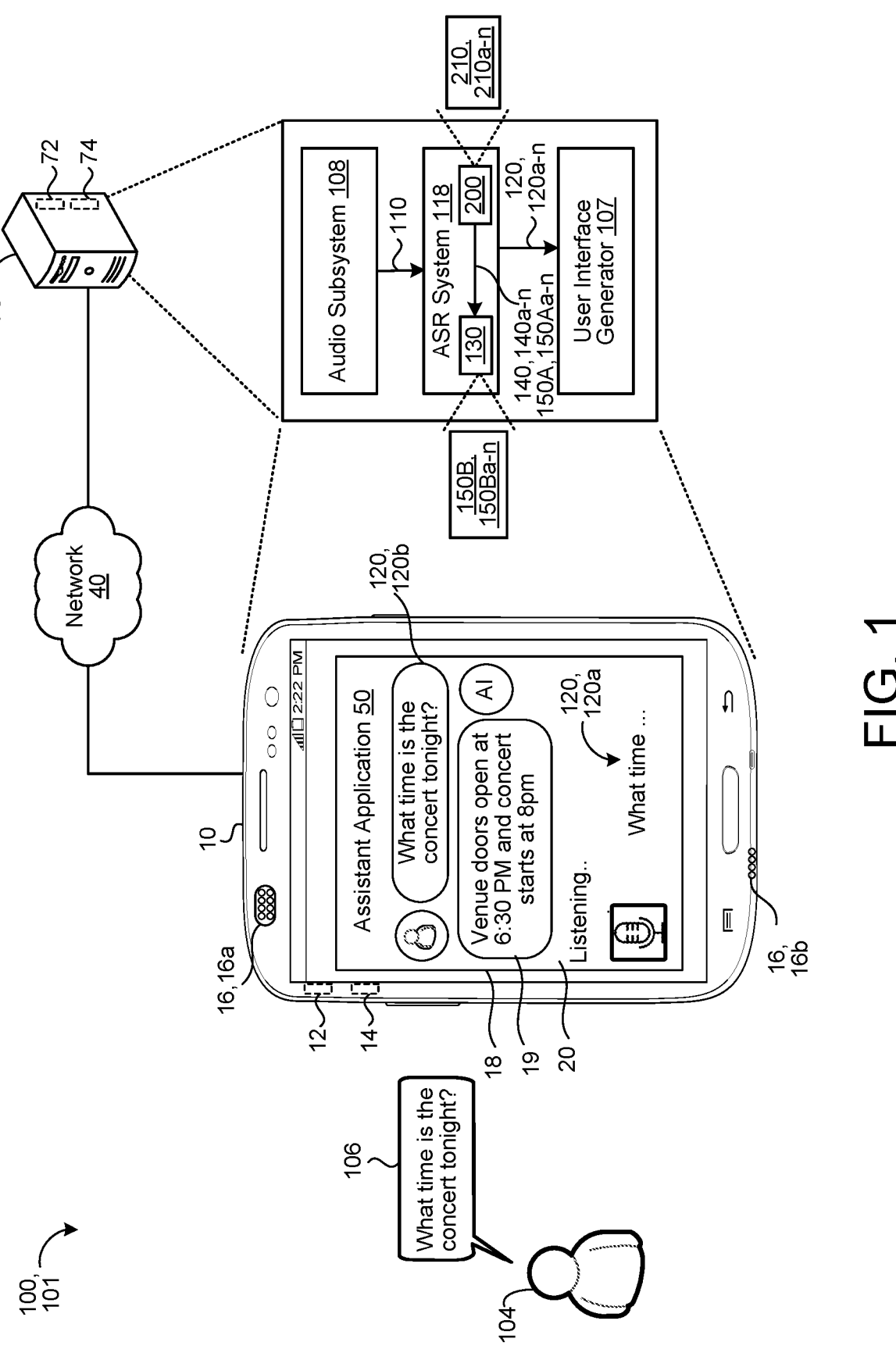
FIG. 1 is a schematic view of an example system and speech environment using a speech recognizer for transcribing speech and reducing flickering.

Modern automatic speech recognition (ASR) systems focus on providing not only high quality (e.g., a low word error rate), but also low latency (e.g., a short delay between the user speaking and a transcription appearing) speech recognition for spoken utterances. For example, when using a device that implements an ASR system, there is often an expectation that the ASR system decodes utterances in a streaming fashion that corresponds to real-time or even faster than real-time. A streaming ASR system starts displaying partial speech recognition results while a user is speaking. Here, the ASR system periodically or aperiodically shows a partial transcription of what has been said thus far. Such partial transcriptions may help the ASR system to be, or at least appear to be, more responsive. In some applications, such as live captioning of video, providing streaming partial transcriptions may be a required feature. Moreover, partial transcriptions may be used by a downstream system to reduce its own latency. For example, a machine translation system may use a partial transcription to start its own processing even before speech recognition is complete.

However, partial transcriptions may change over time and, thus, appear to be unstable. For example, a streaming ASR system may generate a first partial transcription of a first portion of an utterance spoken thus far based on the highest-scored speech recognition hypothesis of a first instance of a beam search. Then, as additional audio frames for the utterance are obtained, the ASR system may extend the beam search to form a second instance of the beam search and select the highest-scored hypothesis of the second instance of the beam search to create a second partial transcription of the utterance. Then, at the end of the utterance, the ASR system may extend the beam search to form a final instance of the beam search and select the highest-scored speech recognition hypothesis on the final instance of the beam search as a final full transcription of the utterance. However, as a user speaks, a partial transcription may not simply append new words to a preceding partial transcription. Thus, words of a partial transcription that were displayed may be removed or changed in a subsequent partial transcription. Moreover, the ASR system may insert new words into a preceding partial transcription when forming a subsequent partial transcription. Thus, partial transcriptions may change or appear to flicker. At its root, flickering is a by-product of a streaming ASR system repeatedly picking the currently highest-scored hypothesis in the lattice of a current instance of a beam search as a partial transcription before the beam search is complete. Contrary to generating a final transcription, which happens once, the decision of picking a partial transcription may be made multiple times. However, as speech recognition progresses, there is no guarantee that a hypothesis picked as a partial transcription is a prefix of the hypothesis picked as a subsequent partial transcription. Thus, the previous partial transcription is not necessarily a prefix of a subsequent partial transcription, and flickering may occur. Flickering may create a poor user experience and may be distracting. For example, as a user speaks, flickering may cause their attention to be drawn back to previously spoken words, thus, increasing their cognitive load and frustration with the system. Moreover, flickering may negate latency gains of a downstream system because, for example, words of a partial transcription are no longer present in a subsequent partial transcription such that previous computations of the downstream system may no longer be relevant. Accordingly, the downstream system may need to reprocess the new partial transcription a new, which may increase latency. Therefore, there is a need for reducing flickering in streaming ASR systems.

Implementations disclosed herein are directed toward flickering reduction with partial hypothesis re-ranking for streaming automatic speech recognition (ASR). As each new partial transcription is generated, disclosed implementations do not simply pick the currently highest-scored speech recognition hypothesis in a current lattice representing a current instance of a beam search as the new partial transcription. Instead, disclosed implementations re-rank each particular speech recognition hypotheses of the current lattice based on whether the particular speech recognition hypothesis shares a prefix with a preceding partial transcription. Here, when the particular speech recognition hypothesis shares a prefix with the preceding partial transcription, disclosed implementations generate a corresponding re-ranked score equal to its corresponding speech recognition score in the current lattice. However, when the particular speech recognition hypothesis does not share a prefix with the preceding partial transcription, disclosed implementations generate a corresponding re-ranked score based on its corresponding speech recognition score in the current lattice and a penalty. Disclosed implementations then select the speech recognition hypothesis with the highest corresponding re-ranked score as the new partial transcription. Thus, for each particular partial transcription, disclosed implementations may not pick the speech recognition hypothesis of the current lattice with the highest corresponding speech recognition score, but may instead pick a different speech recognition hypothesis from the current lattice that balances flickering, quality, and latency. Once the new partial transcription has been generated, disclosed implementations continue the beam search unmodified based on the speech recognition scores on the current instance of the beam search, not the re-ranked scores. Notably, because the beam search and it speech recognition scores are unchanged during the re-ranking, a final transcription of the utterance is unchanged by the re-ranking performed to reduce flickering in partial transcriptions. That is, flicker reduction has no impact on the accuracy of the final transcription. Notably, the re-ranking of the speech recognition hypotheses can be performed with very low complexity and latency.

FIG. 1 is a schematic view of an example of a system 100 and an example speech environment 101. In the speech environment 101, a user's manner of interacting with a computing device, such as a user device 10, may be through voice input. The user device 10 (also referred to generally as a device 10) is configured to capture sounds (e.g., streaming audio data) from one or more users 104 within the speech environment 101. Here, the streaming audio data may refer to a spoken utterance 106 (i.e., an utterance) spoken by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with one or more audio capture devices 16, 16*a* (e.g., microphones) for capturing and converting spoken queries 106 within the speech environment 101 into electrical signals and one or more speech output devices 16, 16*b* (e.g., speakers) for communicating an audible audio signal (e.g., as output audio data from the device 10). While the user device 10 implements a single audio capture device 16*a* in the example shown, the user device 10 may implement an array of audio capture devices 16*a* without departing from the scope of the present disclosure, whereby one or more audio capture devices 16*a* in the array may not physically reside on the user device 10, but be in communication with the audio system 16. Moreover, while the user device 10 implements a single audio output device 16*b* in the example shown, the user device 10 may implement an array of audio output devices 16*b* without departing from the scope of the present disclosure, whereby one or more audio output devices 16*b* in the array may not physically reside on the user device 10, but be in communication with the audio system 16.

In the system 100, a streaming ASR system 118 resides on the user device 10 of the user 104 and/or on a remote computing system 70 (e.g., one or more remote servers of a distributed system executing in a cloud-computing environment) in communication with the user device 10 via a network 40. The user device 10 and/or the remote computing system 70 also includes an audio subsystem 108 configured to receive the utterance 106 spoken by the user 104 and captured by the audio capture device(s) 16*a*, and convert the utterance 106 into a corresponding digital format associated with input audio data 110 (e.g., acoustic frames) capable of being processed by the ASR system 118. In the example shown, the user speaks a respective utterance 106 and the audio subsystem 108 converts the utterance 106 into corresponding audio data 110 (e.g., acoustic frames) for input to the ASR system 118. Thereafter, the ASR system 118 receives, as input, the audio data 110 corresponding to the utterance 106, and generates/predicts, as outputs, corresponding transcriptions 120, 120*a-n* (e.g., speech recognition results) of the utterance 106. In the example shown, the ASR system 118 may perform streaming speech recognition to produce partial transcriptions 120 and a final transcription 120. The remote computing system 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

In the example shown, the streaming ASR system 118 includes a streaming speech recognizer 200 and a flicker reduction rescorer 130. The streaming speech recognizer 200 sequentially processes portions of the audio data 110 as they are received to generate, for each particular portion, one or more partial speech recognition hypotheses 140, 140*a-n* for the utterance 106 up to and including the particular portion. Here, when the speech recognizer 200 has only partially processed the audio data 110 for a utterance 106, the speech recognition hypotheses 140 represent streaming partial speech recognition hypotheses for the utterance 106 and, when the speech recognizer 200 has processed all the audio data 110 for a utterance 106, the speech recognition hypotheses 140 represent full or final speech recognition hypotheses for the utterance 106. Thus, the speech recognizer 200 may generate a plurality of streaming partial transcriptions 120 as the audio data 110 for each portion of the utterance 106 is successively received and processed. Here, each speech recognition hypothesis 140 is represented by a respective sequence of hypothesized terms.

For example, the speech recognizer 200 may process each portion/segment of the audio data 110 as it is received to generate, using a beam search, a sequence of lattices 210, 210*a-n* that each represent a plurality of speech recognition hypotheses 140 for the portion of the utterance 106 characterized by the corresponding portion/segment of the audio data 110 processed by the speech recognizer 200. The speech recognizer 200 generates successive instances of the beam search as portions of the audio data 110 representing the utterance 106 are successively received and processed. Here, a lattice 210 represents multiple possible combinations of words, word pieces, etc. that may form different speech recognition hypotheses 140 for the portion(s) of the utterance 106 received thus far. The speech recognizer 200 evaluates potential paths through a lattice 210 to determine one or more speech recognition hypotheses 140 for the portion(s) of the audio data 110 processed by the speech recognizer 200. The speech recognizer 200 also generates, based on the lattice 210, speech recognition scores 150A, 150Aa-n for corresponding ones of the speech recognition hypothesis 140. Here, the speech recognition scores 150A represent likelihoods of the corresponding speech recognition hypothesis 140 being correct. Alternatively, the speech recognition scores 150A may represent costs associated with the corresponding speech recognition hypothesis 140 being in error. Each speech recognition score 150A indicates a probability that the corresponding speech recognition hypothesis 140 is correct (e.g., matches the portion(s) of the utterance 106 that has been spoken thus far). In some implementations, the speech recognizer 200 includes an end-to-end (E2E) speech recognition model 200, such as a recurrent neural network-transducer (RNN-T) model 200 (see FIG. 2) configured to receive and process audio data 110 to generate the lattices 210.

When the streaming ASR system 118 generates a new partial transcription 120 of a portion of the utterance 106 spoken thus far, the flicker reduction rescorer 130 generates a corresponding re-ranked score 150B, 150Ba-n for each particular partial speech recognition hypotheses 140 of the lattice of a current instance of a beam search. Here, the flicker reduction rescorer 130 may compute the re-ranked scores 150B as $$\underset{i}{\arg\max}\ (\text{score}(hyp[i]) - \alpha * P[i]), \qquad (1)$$

where score (hyp[i]) is the speech recognition likelihood score 150A for the $i^{th}$ partial speech recognition hypothesis 140, P[i] is a penalty determined for the $i^{th}$ partial speech recognition hypothesis 140, and $\alpha$ is a hyperparameter. Alternatively, when the scores 150A are prediction costs, the subtraction in EQN (1) may be replaced with addition. In some implementations, the penalty P[i] is a binary penalty based on whether or not the $i^{th}$ partial speech recognition hypothesis 140 shares a prefix with the preceding partial transcription 120 of the utterance 106. For example, the penalty P[i] may be expressed as $$P(i) \triangleq \begin{cases} 0 & \text{if previous partial is a prefix of } hyp[i] \\ \beta & \text{otherwise} \end{cases}, \qquad (2)$$

where β is a hyperparameter representing the penalty applied to the $i^{th}$ partial speech recognition 140. In some examples, β is set equal to 1.0. Thus, when a particular partial speech recognition hypothesis 140 shares a prefix with the preceding partial transcription of the utterance 106, the flicker reduction rescorer 130 generates the corresponding re-ranked score 150B to be equal to its corresponding speech recognition score 150A in the lattice. However, when the particular partial speech recognition hypothesis 140 does not share a prefix with the preceding partial transcription 120 of the utterance 106, the flicker reduction rescorer 130 generates the corresponding re-ranked score 150B based on its corresponding speech recognition score 150A in the lattice and the penalty β. In other implementations, the penalty P[i] represents a distance function between the prefix of the $i^{th}$ partial speech recognition hypothesis 140 and the preceding partial transcription 120. Here, the distance function may represent a number of word differences between the prefix of the $i^{th}$ partial speech recognition hypothesis 140 and the preceding partial transcription 120. In some examples, the hyperparameters α and β have predetermined values selected to reduce a flicker occurrence rate. For example, selecting smaller values may allow more flickering to occur. For example, consider an example in which a previous partial transcription 120 is "just stand" and there are three partial speech recognition hypotheses 140 of "just send text," "just stand text," and "hello rosa" with corresponding scores 150A of 1.9, 1.7, and 1.5. If β=1 and α is less than 0.2, then the flicker reduction rescorer 180 will select the hypothesis "just send text" even though it causes flicker. However, if α is greater than 0.2, then the flicker reduction rescorer 180 will select the hypothesis "just stand text" to reduce flicker even though it has a lower corresponding speech recognition score 150A. Notably, when none of the speech recognition hypotheses 140 of the lattice includes the prefix of the preceding partial transcription 120, or when the preceding partial transcription 120 is null, then the flicker reduction rescorer 130 penalizes all speech recognition hypotheses 140 equally and effectively selects the speech recognition hypothesis 140 with the highest speech recognition score 150A as the partial transcription 120.

Then, the flicker reduction rescorer 130 generates the new partial transcription 120 for the portion of the utterance 106 spoken thus far by selecting the speech recognition hypothesis 140 having the highest corresponding re-ranked score 150B. The speech recognizer 200 then continues the beam search unmodified based on the speech recognition scores 150A from the current instance of the beam search, which are not modified by the flicker reduction rescorer 130. Notably, because the beam search and the scores 150A are unchanged, the final transcription 120 of the utterance 106 is unchanged by the re-ranking performed by the flicker reduction rescorer 130 to reduce flickering in partial transcriptions. Thus, when generating a final transcription 120 of the utterance 106, the speech recognizer 200 selects, as is conventional, the speech recognition hypothesis 140 having the highest corresponding speech recognition score 150A.

The user device 10 and/or the remote computing system 70 also executes a user interface generator 107 configured to present or display a representation of the partial and final transcriptions 120 of the utterance 106 to the user 104 of the user device 10. As described in greater detail below, the user interface generator 107 may display partial transcriptions 120 in a streaming fashion before displaying a final transcription 120. In some configurations, the transcriptions 120 output from the ASR system 118 are processed, e.g., by a natural language processing/understanding (NLP/NLU)

module executing on the user device 10 or the remote computing system 70, to execute a user command/query specified by the utterance 106. Additionally or alternatively, a text-to-speech system (not shown) (e.g., executing on any combination of the user device 10 or the remote computing system 70) may convert the transcription 120 into synthesized speech for audible output by the user device 10 and/or another device.

In the example shown, the user 104 interacts with a program or application (e.g., a digital assistant application 50) of the user device 10 that uses the ASR system 118. For instance, FIG. 1 depicts the user 104 communicating with the digital assistant application 50 and the digital assistant application 50 displaying a digital assistant interface 18 on a display 20 of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into audio data 110 for input to the ASR system 118. Here, as the audio data 110 is received, a partial transcription 120a of "What time" is displayed and then, when the utterance 106 is ended, a final full transcription 120b of "What time is the concert tonight?" is displayed.

Figure 2:
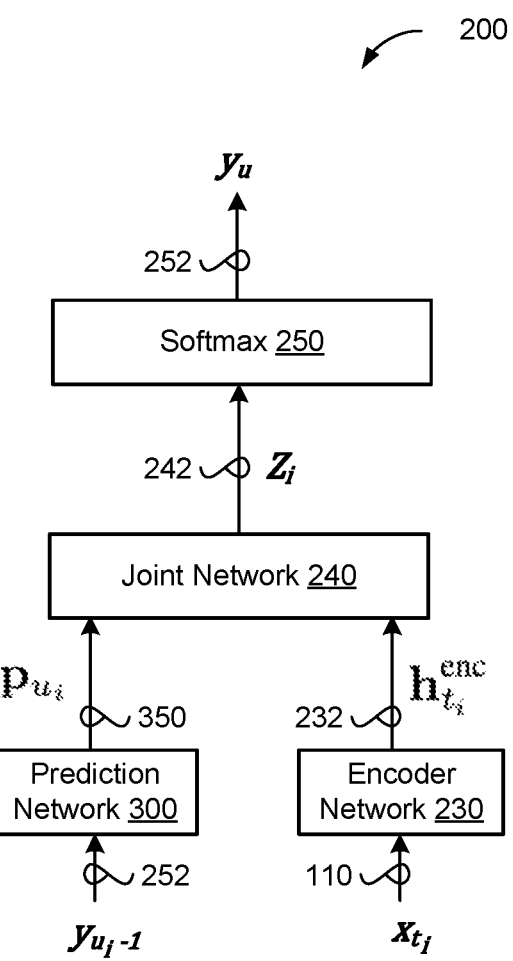
FIG. 2 is a schematic view of an example recurrent neural network-transducer (RNN-T) model architecture.

FIG. 2 is a schematic view of an example recurrent neural network-transducer (RNN-T) model 200. The RNN-T model 200 provides a small computational footprint and utilizes less memory requirements than conventional ASR architectures, making the RNN-T model 200 suitable for performing speech recognition entirely on the user device 10 (e.g., no communication with a remote server is required).

As shown, the RNN-T model 200 includes an encoder network 230, a prediction network 300, a joint network 240, and a final Softmax layer 250. The prediction network 300 and the joint network 240 may collectively provide an RNN-T decoder. The encoder network 230, which is roughly analogous to an acoustic model (AM) in a traditional ASR system, includes a recurrent network of stacked Long Short-Term Memory (LSTM) layers. For instance, the encoder network 230 reads a sequence of d-dimensional feature vectors (e.g., audio data 110 (FIG. 1)) $x=(x_1, x_2, \ldots, x_T)$, where $x_i \in \mathbb{R}^d$, and produces at each time step a higher-order feature representation 232. This higher-order feature representation 232 is denoted as $$h_1^{enc}, \ldots, h_T^{enc}.$$

Similarly, the prediction network 300 is also an LSTM network, which, like a language model (LM), processes the sequence of non-blank symbols 252 output by the final Softmax layer 250 so far, $y_0, \ldots, y_{ui-1}$, into a dense or hidden representation $p_{u_i}$ 350. Described in greater detail below, the representation $p_{u_i}$ 350 includes a single embedding vector. Notably, the sequence of non-blank symbols 252 received at the prediction network 300 capture linguistic dependencies between non-blank symbols 252 predicted during the previous time steps so far to assist the joint network 240 in predicting the probability of a next output symbol or blank symbol during the current time step. As described in greater detail below, to contribute to techniques for reducing the size of the prediction network 300 without sacrificing accuracy/performance of the RNN-T model 200, the prediction network 300 may receive a limited-history sequence of non-blank symbols 252 $y_{ui-n}, \ldots, y_{ui-1}$ that is limited to the N previous non-blank symbols 252 output by the final Softmax layer 250.

The joint network 240 combines the higher-order feature representation $$h_{t_i}^{enc}$$

232 produced by the encoder network 230 and the representation $p_{u_i}$ 350 (i.e., single embedding vector 350) produced by the prediction network 300. The joint network 240 predicts a distribution $Z_i = P(y_i | x_{t_i}, y_0, \ldots, y_{u_{i-1}})$ 242 over the next output symbol. Stated differently, the joint network 240 generates, at each time step, a probability distribution 242 over possible speech recognition hypotheses 140. Here, the possible speech recognition hypotheses 140 correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 240 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 240 can include a posterior probability value for each of the different output labels. Thus, if there are 100 different output labels representing different graphemes or other symbols, the output $Z_i$ 252 of the joint network 240 can include 100 different probability values, one for each output label. The probability distribution can then be used to select and assign scores to candidate orthographic elements (e.g., graphemes, wordpieces, and/or words) in a beam search process (e.g., by the Softmax layer 250) for determining the transcription 120.

The final Softmax layer 250 receives the probability distribution $Z_i$ 252 for the final speech recognition result 120 and selects the output label/symbol with the highest probability to produce the transcription. The final Softmax layer 250 may employ any technique to select the output label/symbol with the highest probability in the distribution $Z_i$ 252. In this manner, the RNN-T model 200 does not make a conditional independence assumption, rather the prediction of each symbol $y_u$ 252 is conditioned not only on the acoustics but also on the sequence of labels 252 $y_{ui-n}, \ldots, y_{ui-1}$ output so far. The RNN-T model 200 does assume an output symbol 252 is independent of future acoustic frames 110, which allows the RNN-T model 200 to be employed in a streaming fashion.

A final transcription 120 is presumed to be more accurate than partial transcriptions 120 because the RNN-T model 200 determines the partial transcriptions 120 in a streaming fashion and the final transcription 120 using the prior non-blank symbols from the partial transcriptions 120. That is, the final transcription 120 takes into account the prior non-blank symbols and, thus, are presumed more accurate because the partial transcriptions 120 do not take into account any prior non-blank symbols.

In some examples, the encoder network 230 of the RNN-T model 200 includes eight 2,048-dimensional LSTM layers, each followed by a 740-dimensional projection layer. In other implementations, the encoder network 230 includes a plurality of multi-headed attention layers. For instance, the plurality of multi-headed attention layers may include a network of conformer or transformer layers. The prediction network 300 may have two 2,048-dimensional LSTM layers, each of which is also followed by 740-dimensional projection layer as well as an embedding layer of 128 units. Finally, the joint network 240 may also have 740 hidden units. The Softmax layer 250 may be composed of a unified word piece or grapheme set that is generated using all unique word pieces or graphemes in training data. When the output symbols/labels include wordpieces, the set of output symbols/labels may include 4,096 different word pieces. When the output symbols/labels include graphemes, the set of output symbols/labels may include less than 100 different graphemes.

Figure 3:
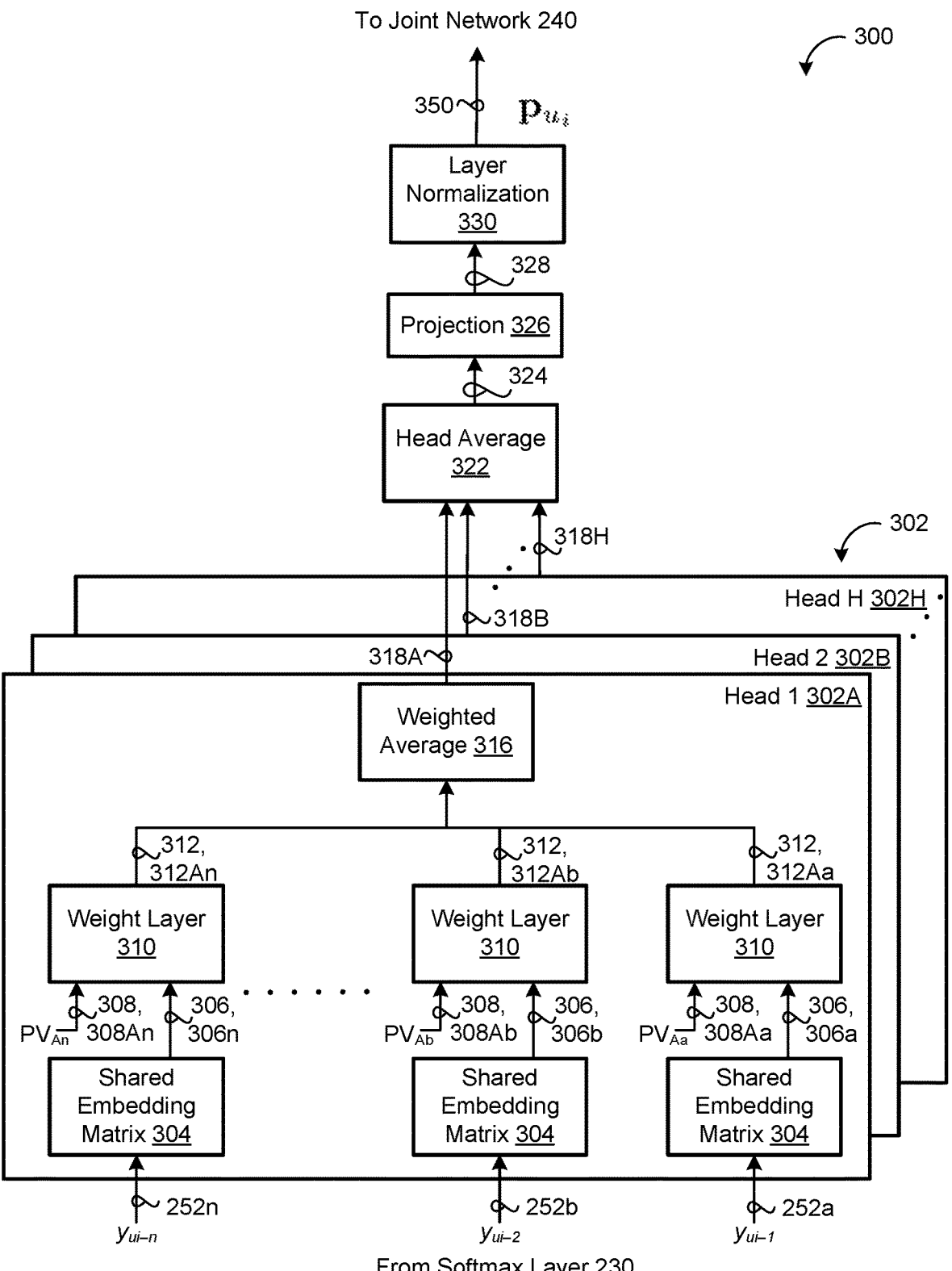
FIG. 3 is a schematic view of an example tied and reduced prediction network of the RNN-T model architecture of FIG. 2.

FIG. 3 is a schematic view of an example prediction network 300 for the RNN-T model 200. The prediction network 300 receives, as input, a sequence of non-blank symbols 252$a$-$n$ $y_{ui-n}, \ldots, y_{ui-1}$ that is limited to the N previous non-blank symbols 252$a$-$n$ output by the final Softmax layer 250. In some examples, N is equal to two. In other examples, N is equal to five, however, the disclosure is non-limiting and N may equal any integer. The sequence of non-blank symbols 252$a$-$n$ indicates a partial speech recognition result. In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306$a$-$n$ (e.g., $X \in \mathbb{R}^{N \times d_e}$) for each non-blank symbol among the sequence of non-blank symbols 252$a$-$n$ $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols 252$a$-$n$ $y_{ui-n}, \ldots, y_{ui-1}$. The respective position vector PV 308 assigned to each non-blank symbol indicates a position in the history of the sequence of non-blank symbols (e.g., the N previous non-blank symbols 252$a$-$n$ output by the final Softmax layer 250). For instance, the first position vector $PV_{Aa}$ is assigned to a most recent position in the history, while the last position vector $PV_{An}$ is assigned to a last position in the history of the N previous non-blank symbols output by the final Softmax layer 250. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols 252a-n $y_{ui-n}$, . . . , $y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308$_{Ba-Bn}$, . . . , and the H$^{th}$ head 302H defines another different row of position vectors $PV_{Ha-Hn}$ 308$_{Ha-Hn}$.

For each non-blank symbol in the sequence of non-blank symbols 252a-n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H*N}\sum_{h,n} X_n * \sum_e (X_{n,e} * P_{h,n,e}) \quad (3)$$

In Equation (3), h represents the index of the heads 302, n represents position in context, and e represents the embedding dimension. Additionally, in Equation (3), H, N, and d$_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $p_{u_i}$ 350 at the corresponding time step from the plurality of time steps. The prediction network 300 generates only a single embedding vector $p_{u_i}$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $p_{u_i}$ 350.

In some implementations, to further reduce the size of the RNN-T decoder, i.e., the prediction network 300 and the joint network 240, parameter tying between the prediction network 300 and the joint network 240 is applied. Specifically, for a vocabulary size |V| and an embedding dimension d$_e$, the shared embedding matrix 304 at the prediction network is $E \in \mathbb{R}^{|V| \times d_e}$. Meanwhile, a last hidden layer includes a dimension size d$_h$ at the joint network 240, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 240 includes a weight matrix [d$_h$, |V|]. By having the prediction network 300 to tie the size of the embedding dimension d$_e$ to the dimensionality d$_h$ of the last hidden layer of the joint network 240, the feed-forward projection weights of the joint network 240 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension d$_e$ equal to the size of the hidden layer dimension d$_h$, the RNN-T decoder reduces a number of parameters equal to the product of the embedding dimension d$_e$ and the vocabulary size |V|. This weight tying corresponds to a regularization technique.

FIG. 4 is a flowchart of an exemplary arrangement of operations for a computer-implemented method 700 for reducing flickering by re-ranking partial hypotheses for streaming ASR. The operations may be performed by data processing hardware 510 (e.g., the data processing hardware 12 of the user device 10 or the data processing hardware 72 of the remote computing system 70) based on executing instructions stored on memory hardware 520 (e.g., the memory hardware 14 of the user device 10 or the memory hardware 74 of the remote computing system 70). At operation 402, the method 400 includes receiving audio data 110 corresponding to a utterance 106 spoken by a user 104.

The method 400 includes, at operation 404, processing, using a speech recognizer 200, a first portion of the audio data 110 to generate a first lattice 210 representing a first plurality of partial speech recognition hypotheses 140 for the utterance 106 and a first plurality of speech recognition scores 150A for corresponding ones of the first plurality of partial speech recognition hypotheses 140. At operation 406, the method 400 includes generating a first partial transcription 102 for the utterance 106 by selecting the partial speech recognition hypothesis 140 of the first plurality of partial speech recognition hypotheses 140 having the highest speech recognition score 150A of the first plurality of speech recognition scores 150A.

At operation 408, the method 400 includes processing, using the speech recognizer 200, a second portion of the audio data 110 to generate, based on the first lattice 210, a second lattice 210 representing a second plurality of partial speech recognition hypotheses 140 for the utterance 106 and a second plurality of speech recognition scores 150A for corresponding ones of the second plurality of partial speech recognition hypotheses 140. The method 400 includes, at operation 410, for each particular partial speech recognition hypothesis 140 of the second plurality of partial speech recognition hypotheses 140, generating a corresponding re-ranked score 150B based on the corresponding speech recognition score 150A of the second plurality of speech recognition scores 150A and whether the particular partial speech recognition hypothesis 140 shares a prefix with the first partial transcription 120. At operation 412, the method 400 includes generating a second partial transcription 120 for the utterance 106 by selecting the partial speech recognition hypothesis 140 of the second plurality of partial speech recognition hypotheses 140 having the highest corresponding re-ranked score 150B.

Figure 5:
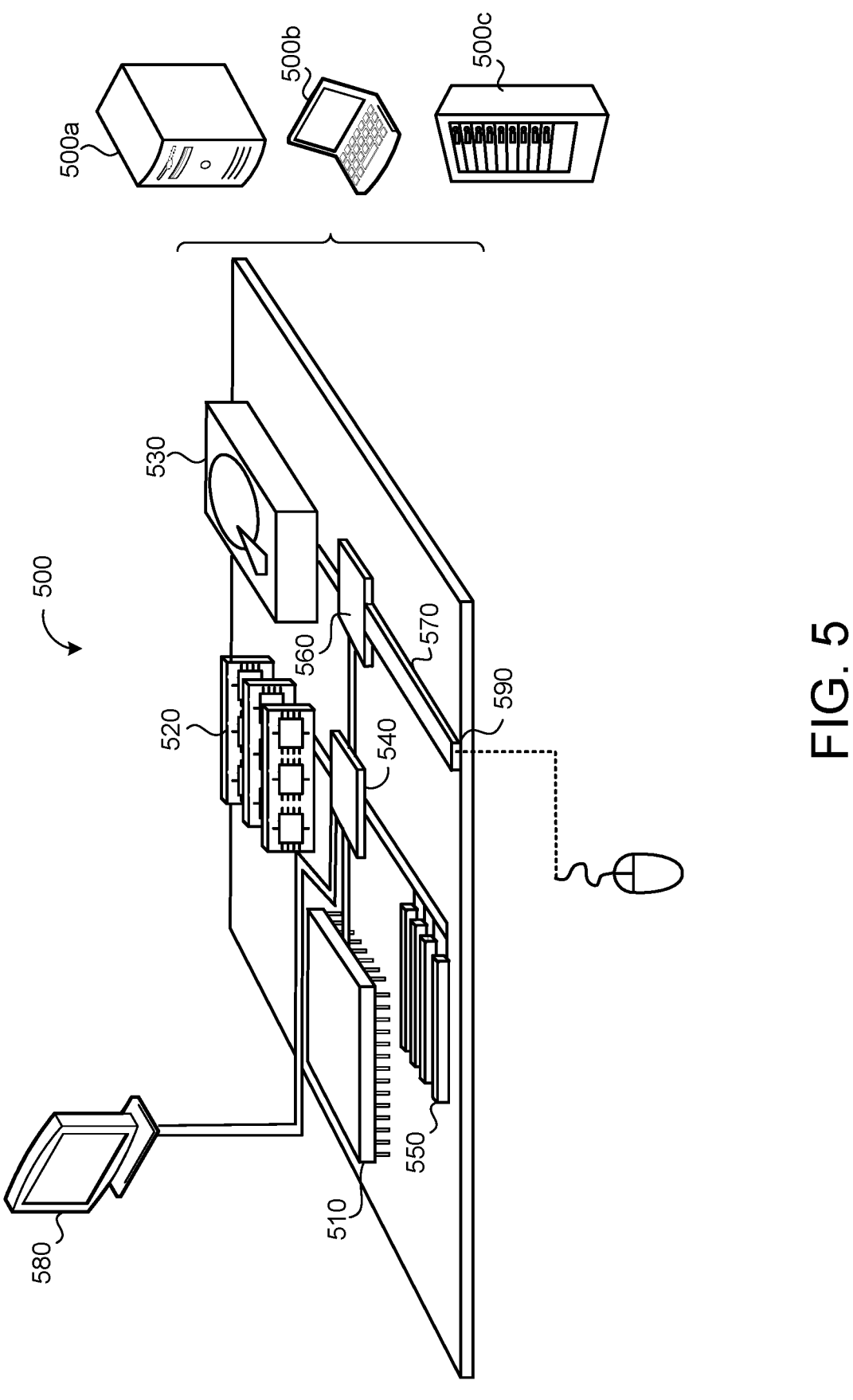
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (i.e., data processing hardware) that can be used to implement the data processing hardware 12 and/or 72, memory 520 (i.e., memory hardware) that can be used to implement the memory hardware 14 and/or 74, a storage device 530 (i.e., memory hardware) that can be used to implement the memory hardware 14 and/or 74, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving audio data corresponding to an utterance spoken by a user;

processing, using a speech recognizer, a first portion of the audio data to generate a first lattice representing a first plurality of partial speech recognition hypotheses for the utterance and a first plurality of speech recognition scores for corresponding ones of the first plurality of partial speech recognition hypotheses;

generating a first partial transcription for the utterance by selecting the partial speech recognition hypothesis of the first plurality of partial speech recognition hypotheses having the highest corresponding speech recognition score of the first plurality of speech recognition scores;

displaying of the first partial transcription on a display in communication with the data processing hardware;

processing, using the speech recognizer, a second portion of the audio data to generate, based on the first lattice, a second lattice representing a second plurality of partial speech recognition hypotheses for the utterance and a second plurality of speech recognition scores for corresponding ones of the second plurality of partial speech recognition hypotheses;

for each particular partial speech recognition hypothesis of the second plurality of partial speech recognition hypotheses, generating a corresponding re-ranked score based on the corresponding speech recognition score of the second plurality of speech recognition scores and whether the particular partial speech recognition hypothesis shares a prefix with the first partial transcription;

generating a second partial transcription for the utterance by selecting the partial speech recognition hypothesis of the second plurality of partial speech recognition hypotheses having the highest corresponding re-ranked score; and

displaying the second partial transcription on the display, the second partial transcription displayed on the display replacing the first partial transcription displayed on the display, wherein generating the corresponding re-ranked scores does not change values of the second plurality of speech recognition scores of the second lattice.

2. The computer-implemented method of claim 1, wherein generating the corresponding re-ranked score for each particular partial speech recognition hypothesis of the second plurality of partial speech recognition hypotheses comprises:

determining that the particular partial speech recognition hypothesis does not share the prefix with the first partial transcription; and in response to determining that the particular partial speech recognition hypothesis does not share the prefix with the first partial transcription, adjusting the corresponding speech recognition score of the second plurality of speech recognition scores by a pre-determined amount.

3. The computer-implemented method of claim 1, wherein generating the corresponding re-ranked score for each particular partial speech recognition hypothesis of the second plurality of partial speech recognition hypotheses comprises:

determining a distance between the particular partial speech recognition hypothesis and the first partial transcription; and adjusting the corresponding speech recognition score of the second plurality of speech recognition scores based on the distance.

4. The computer-implemented method of claim 1, wherein the operations further comprise:

processing, using the speech recognizer, a final portion of the audio data to generate, based on a preceding lattice, a final lattice representing a plurality of full speech recognition hypotheses for the utterance and a final plurality of speech recognition scores for corresponding ones of the plurality of full speech recognition hypotheses; and generating a final transcription for the utterance by selecting the full speech recognition hypothesis of the plurality of full speech recognition hypotheses having the highest corresponding speech recognition score of the final plurality of speech recognition scores.

5. The computer-implemented method of claim 1, wherein the operations further comprise:

processing, using the speech recognizer, a third portion of the audio data to generate, based on the second lattice, a third lattice representing a third plurality of partial speech recognition hypotheses for the utterance and a third plurality of speech recognition scores for corresponding ones of the third plurality of partial speech recognition hypotheses;

for each particular partial speech recognition hypothesis of the third plurality of partial speech recognition hypotheses, generating a re-ranked score based on the corresponding speech recognition score of the third plurality of speech recognition scores and whether the particular partial speech recognition hypothesis includes the second partial transcription; and generating a third partial transcription for the utterance by selecting the speech recognition hypothesis of the third plurality of partial speech recognition hypotheses having the highest corresponding re-ranked score.

6. The computer-implemented method of claim 1, wherein:

the first lattice represents a first streaming partial speech recognition result output from the speech recognizer during a first instance of a beam search; and the second lattice represents a second streaming partial speech recognition result output from the speech recognizer during a second instance of the beam search.

7. The computer-implemented method of claim 1, wherein the speech recognizer comprises an end-to-end speech recognition model.

8. The computer-implemented method of claim 1, wherein:

the utterance spoken by the user is captured by a user device associated with the user; and the data processing hardware resides on the user device.

9. A system comprising:

data processing hardware; and memory hardware in communication with the data processing hardware and storing instructions that, when executed on the data processing hardware, cause the system to perform operations comprising:

receiving audio data corresponding to an utterance spoken by a user;

processing, using a speech recognizer, a first portion of the audio data to generate a first lattice representing a first plurality of partial speech recognition hypotheses for the utterance and a first plurality of speech recognition scores for corresponding ones of the first plurality of partial speech recognition hypotheses;

generating a first partial transcription for the utterance by selecting the partial speech recognition hypothesis of the first plurality of partial speech recognition hypotheses having the highest corresponding speech recognition score of the first plurality of speech recognition scores;

displaying of the first partial transcription on a display in communication with the data processing hardware;

processing, using the speech recognizer, a second portion of the audio data to generate, based on the first lattice, a second lattice representing a second plurality of partial speech recognition hypotheses for the utterance and a second plurality of speech recognition scores for corresponding ones of the second plurality of partial speech recognition hypotheses;

for each particular partial speech recognition hypothesis of the second plurality of partial speech recognition hypotheses, generating a corresponding re-ranked score based on the corresponding speech recognition score of the second plurality of speech recognition scores and whether the particular partial speech recognition hypothesis shares a prefix with the first partial transcription;

generating a second partial transcription for the utterance by selecting the partial speech recognition hypothesis of the second plurality of partial speech recognition hypotheses having the highest corresponding re-ranked score; and displaying the second partial transcription on the display, the second partial transcription displayed on the display replacing the first partial transcription displayed on the display, wherein generating the corresponding re-ranked scores does not change values of the second plurality of speech recognition scores of the second lattice.

10. The system of claim 9, wherein generating the corresponding re-ranked score for each particular partial speech recognition hypothesis of the second plurality of partial speech recognition hypotheses comprises:

determining that the particular partial speech recognition hypothesis does not share the prefix with the first partial transcription; and in response to determining that the particular partial speech recognition hypothesis does not share the prefix with the first partial transcription, adjusting the corresponding speech recognition score of the second plurality of speech recognition scores by a pre-determined amount.

11. The system of claim 9, wherein generating the corresponding re-ranked score for each particular partial speech recognition hypothesis of the second plurality of partial speech recognition hypotheses comprises:

determining a distance between the particular partial speech recognition hypothesis and the first partial transcription; and adjusting the corresponding speech recognition score of the second plurality of speech recognition scores based on the distance.

12. The system of claim 9, wherein the operations further comprise:

processing, using the speech recognizer, a final portion of the audio data to generate, based on a preceding lattice, a final lattice representing a plurality of full speech recognition hypotheses for the utterance and a final plurality of speech recognition scores for corresponding ones of the plurality of full speech recognition hypotheses; and generating a final transcription for the utterance by selecting the full speech recognition hypothesis of the plurality of full speech recognition hypotheses having the highest corresponding speech recognition score of the final plurality of speech recognition scores.

13. The system of claim 9, wherein the operations further comprise:

processing, using the speech recognizer, a third portion of the audio data to generate, based on the second lattice, a third lattice representing a third plurality of partial speech recognition hypotheses for the utterance and a third plurality of speech recognition scores for corresponding ones of the third plurality of partial speech recognition hypotheses;

for each particular partial speech recognition hypothesis of the third plurality of partial speech recognition hypotheses, generating a re-ranked score based on the corresponding speech recognition score of the third plurality of speech recognition scores and whether the particular partial speech recognition hypothesis includes the second partial transcription; and generating a third partial transcription for the utterance by selecting the speech recognition hypothesis of the third plurality of partial speech recognition hypotheses having the highest corresponding re-ranked score.

14. The system of claim 9, wherein:

the first lattice represents a first streaming partial speech recognition result output from the speech recognizer during a first instance of a beam search; and the second lattice represents a second streaming partial speech recognition result output from the speech recognizer during a second instance of the beam search.

15. The system of claim 9, wherein the speech recognizer comprises an end-to-end speech recognition model.

16. The system of claim 9, wherein:

the utterance spoken by the user is captured by a user device associated with the user; and the data processing hardware resides on the user device.

\* \* \* \* \*